United States Patent
Lin (10) Patent No.: US 12,004,199 B2
(45) Date of Patent: Jun. 4, 2024

(54) METHOD FOR TRANSMITTING A MESSAGE COMPRISING INFORMATION RELATING TO THE RECEPTION OF DATA BY A PIECE OF RECEIVING EQUIPMENT BELONGING TO A BROADCAST GROUP, CORRESPONDING DEVICES AND COMPUTER PROGRAMS

(71) Applicant: Orange, Issy-les-Moulineaux (FR)

(72) Inventor: Hao Lin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 325 days.

(21) Appl. No.: 17/416,422

(22) PCT Filed: Dec. 10, 2019

(86) PCT No.: PCT/FR2019/052987
§ 371 (c)(1),
(2) Date: Jun. 18, 2021

(87) PCT Pub. No.: WO2020/128220
PCT Pub. Date: Jun. 25, 2020

(65) Prior Publication Data
US 2022/0053454 A1    Feb. 17, 2022

(30) Foreign Application Priority Data
Dec. 20, 2018  (FR) ...................... 1873576

(51) Int. Cl.
*H04W 72/30* (2023.01)
*H04W 4/06* (2009.01)
(Continued)

(52) U.S. Cl.
CPC ............. *H04W 72/30* (2023.01); *H04W 4/06* (2013.01); *H04W 72/044* (2013.01); *H04W 4/40* (2018.02)

(58) Field of Classification Search
CPC ....... H04W 4/06; H04W 4/40; H04W 72/044; H04W 72/30
See application file for complete search history.

(56) References Cited

U.S. PATENT DOCUMENTS

2017/0310525 A1* 10/2017 Lin ................... H04L 27/2698
2018/0091265 A1*  3/2018 Liu ........................... H04L 1/08
(Continued)

FOREIGN PATENT DOCUMENTS

EP           3352486 A1      7/2018

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)" 3GPP Standard; 3GPP Ts 36.331, $3^{RD}$ Generation Partnership Project (3GPP), Mobile Competence Centre; 650, Route Des Lucioles; F-06921 Sophia-Antipolis Cedex; France, vol. RAN WG2, No. V13.1.0, Apr. 1, 2016, pp. 1-551.

(Continued)

*Primary Examiner* — Khaled M Kassim
*Assistant Examiner* — Kai Chang
(74) *Attorney, Agent, or Firm* — Knobbe, Martens, Olson & Bear, LLP (57) ABSTRACT

In a vehicle to anything environment, in order to achieve good data reception, receiving equipment and transmission equipment are preconfigured and thus include all the parameters needed for data transmission. In order to increase the probability of the data being received by the receiving equipment, the transmission equipment uses a highly robust modulation and coding scheme to code and modulate the radio signal used to broadcast the data. However, the more robust the implemented modulation and coding scheme, the lower the spectral efficiency of the radio signal used for (Continued)

transmission. User equipments belonging to the same broadcast group are identified by means of an identifier of the broadcast group, which allows for the implementation of a mechanism of acknowledgement by the receiving equipments making it possible to inform the transmission equipment that an error has occurred in the reception of the broadcast data.

14 Claims, 3 Drawing Sheets

(51) Int. Cl.
    *H04W 4/40*          (2018.01)
    *H04W 72/044*      (2023.01)

(56) References Cited

U.S. PATENT DOCUMENTS

| | | | |
|---|---|---|---|
| 2019/0028862 A1* | 1/2019 | Futaki | H04W 4/44 |
| 2020/0092685 A1* | 3/2020 | Fehrenbach | H04W 72/23 |
| 2020/0100167 A1* | 3/2020 | Cheng | H04W 80/02 |
| 2020/0154404 A1* | 5/2020 | Göktepe | H04L 1/1614 |
| 2020/0275244 A1* | 8/2020 | Lee | H04W 84/18 |
| 2020/0383100 A1* | 12/2020 | Yu | H04W 72/02 |

OTHER PUBLICATIONS

Written Opinion for International Application No. PCT/FR2019/052987 mailed on Feb. 27, 2020.

\* cited by examiner

METHOD FOR TRANSMITTING A MESSAGE COMPRISING INFORMATION RELATING TO THE RECEPTION OF DATA BY A PIECE OF RECEIVING EQUIPMENT BELONGING TO A BROADCAST GROUP, CORRESPONDING DEVICES AND COMPUTER PROGRAMS

CROSS-REFERENCE TO RELATED APPLICATIONS

This application is filed under 35 U.S.C. § 371 as the U.S. National Phase of Application No. PCT/FR2019/052987 entitled "METHOD FOR TRANSMITTING A MESSAGE COMPRISING INFORMATION RELATING TO THE RECEPTION OF DATA BY A PIECE OF RECEIVING EQUIPMENT BELONGING TO A BROADCAST GROUP, CORRESPONDING DEVICES AND COMPUTER PROGRAMS" and filed Dec. 10, 2019, and which claims priority to FR 1873576 filed Dec. 20, 2018, each of which is incorporated by reference in its entirety.

BACKGROUND

Field

The field of the development is that of broadcasting data to a group of user equipment such as mobile terminals. More specifically, the development refers to the field of V2X (Vehicle to anything), which concerns the broadcasting of data between a user equipment in a vehicle and at least another user equipment belonging to the broadcast group of the user equipment in the vehicle.

Description of the Related Technology

The broadcasting of data as part of V2X consists in transferring information from a communication equipment on board a vehicle, to at least one other communication equipment associated with or on board an entity capable of affecting the vehicle, and vice versa. V2X defines a vehicle communication system integrating other types of more specific communication, such as V2I (vehicle to infrastructure), V2N (vehicle to network), V2V (vehicle to vehicle), V2P (vehicle to pedestrian), and so on.

Such a communication mode is particularly appealing in the context of a grouping of vehicles in platoons (platooning[1]), or roadway convoys travelling over an automated highway system.

Vehicle platoons make it possible to shorten the distances between vehicles in the platoon thanks to V2X communication. This ability allows vehicles in the platoon to accelerate or brake in unison, for example. Thus, an electronically chained vehicle platoon would travel as a single unit.

Thus, a first communication equipment on board a first vehicle is a transmission equipment broadcasting data to other receiving equipment on board other vehicles. The transmission equipment broadcasts data over a communication channel called a "sidelink" or SL in the 3GPP RAN specifications (*Third Generation Partnership Project Radio Access Network*). The transmission equipment broadcasts data over the SL without knowing the identity of the receiving equipment receiving and processing the broadcast data. Indeed, contrary to the so-called "multicast" broadcasting technique, the receiving equipments do not subscribe to a broadcast stream and therefore do not provide their identifiers to the transmission equipment.

To allow for good data reception, the receiving equipment and the transmission equipment are preconfigured, such as by a manufacturer of receiving equipments and transmission equipments, thus providing all the parameters needed for data transmission between the transmission equipment and the receiving equipments intended to receive the data broadcast by the transmission equipment to the user equipments involved.

In order to increase the probability of the data being received by the receiving equipments, the transmission equipment uses a highly robust Modulation and Coding Scheme (MCS) to code and modulate the radio signal used to broadcast the data over a transmission channel. Indeed, since the transmission equipment has no way of knowing whether the broadcast data have been properly received by the receiving equipments, given that it does not know the receiving equipments' identity and there is no communication channel established between the receiving equipments and the transmission equipment, using a highly robust modulation and decoding scheme has a positive impact on the reception of the data by the receiving equipments. However, the more robust the implemented modulation and coding scheme, the lower the spectral efficiency of the radio signal used for transmission.

There is consequently a need for a data broadcasting solution between a transmission equipment and receiving equipments belonging to a same broadcast group that is free of all or some of the aforementioned drawbacks.

SUMMARY OF CERTAIN INVENTIVE ASPECTS

The development satisfies this need by offering a method for transmitting a message comprising information on the reception of data by a receiving equipment belonging to a broadcast group comprising a plurality of receiving equipments and a transmission equipment, the transmission method being implemented by said receiving equipment and comprising the following steps of: receiving a first message comprising an identifier of the broadcast group and at least a first set of information on the generation of said message, by said receiving equipment, comprising information on the reception of data, the first message being transmitted by a base station in a radio communication network to which all the equipments belonging to the broadcast group are connected, receiving a second message, broadcast by the transmission equipment, comprising the identifier of the broadcast group, a second set of information on the generation, by said receiving equipment, of said message comprising information on the reception of data, and at least one parameter pertaining to data to be broadcast by the transmission equipment, transmission of the message comprising information on an error having occurred during the reception of data broadcast by the transmission equipment.

Thus, the development is based on the fact that all the user equipments belonging to a same broadcast group are identified by means of an identifier of the broadcast group. The identifier of the group is then used during the broadcasting of data by the transmission equipment, informing all the receiving equipments belonging to the broadcast group that the data received are intended for them.

In addition, using a group identifier allows for the implementation of a mechanism of acknowledgement by the receiving equipments making it possible to inform the transmission equipment that an error has occurred in the reception of the broadcast data.

Indeed, knowing the identifier of the group associated with information on the generation, by said receiving equipment, of said message comprising information on the reception of data allows for the implementation of a mechanism of acknowledgement by the receiving equipments making it possible to inform the transmission equipment that an error has occurred in the reception of the broadcast data.

By only sending a message when the reception of the data has not transpired correctly, it is possible to limit the number of time-frequency resources allocated to the transmission of information on the occurrence of an error in the reception of the broadcast data.

The use of a base station to constitute the broadcast groups makes it possible to build flexibility into the solution. In this way, everything is dynamic: the members of a broadcast group, the information on the generation of the message comprising information on the reception of data, and so on.

It is then possible for a vehicle to change platoon as a function of needs, something that is not possible in the solutions of the prior art.

Such a solution has numerous advantages. For example, using a single identifier for all the members of the broadcast group, and not one identifier per member of the group, reduces the amount of data to be transmitted in the second message without negatively impacting the spectral efficiency of the radio signal.

According to a first feature of the development, the information on the generation of said message comprising information on the reception of data comprises at least one identifier of time-frequency resources of at least one pool of time-frequency resources to be used to transmit said message comprising information on the reception of data.

Such a solution makes it possible to multiplex the messages of the various receiving equipments within the same time-frequency resource.

According to a second feature of the development, the first message further comprises a parameter indicating that the message comprising information on an error having occurred during the reception of data broadcast by the transmission equipment is transmitted to the base station.

According to a third feature of the development, the first message further comprises a parameter indicating that the message comprising information on an error having occurred during the reception of data broadcast by the transmission equipment is transmitted to the transmission equipment.

According to a fourth feature of the development, the information on the generation of said message comprising information on the reception of data further comprises a complex-valued mathematical sequence which, when said sequence is applied to the radio signal to be used to transmit said message comprising information on an error having occurred during the reception of data broadcast by the transmission equipment, modifies the amplitude of said radio signal to make it constant.

Using a single mathematical sequence that is common to all the members of the broadcast group makes it possible to do away with synchronization problems in the transmission of messages comprising information on the reception of data transmitted by various receiving equipments.

Such a mathematical sequence is, for example, a Zadoff-Chu sequence in which one of the properties is that it is easily detectable.

According to a fifth feature of the development, each receiving equipment having received an identifier of a time-frequency resource of said at least one pool of time-frequency resources to be used to transmit said message that is specific to it, the development comprises, as applicable, a step for transmitting information indicating a proper reception of the data broadcast by the transmission equipment.

In this embodiment, some of the receiving equipments in the broadcast group, such as the ones most remote from the transmission equipment, receive an identifier of the time-frequency resources to be used to transmit said message in such a way that, depending on the time-frequency resource used for transmission of the message, the receiving equipment is capable of identifying the impacted receiving equipment. The association of a particular time-frequency resource with a given receiving equipment also makes it possible to inform the transmission equipment of the proper reception of the broadcast data.

The development also relates to a method of communication between a transmission equipment and at least one receiving equipment, both of which belonging to a broadcast group, the communication method being implemented by said transmission equipment and comprising the following steps for: receiving a first message comprising an identifier of the broadcast group and at least a first set of information on the generation of said message, by said receiving equipment, comprising information on the reception of data, the first message being transmitted by a base station in a radio communication network to which all the equipments belonging to the broadcast group are connected, broadcasting a second message, intended for the receiving equipments of the broadcast group, comprising the identifier of the broadcast group, a second set of information on the generation, by said receiving equipment, of said message comprising information on the reception of data, and at least one parameter pertaining to data to be broadcast by the transmission equipment, receiving at least one message transmitted by at least one receiving equipment comprising information on an error having occurred during the reception of data broadcast by the transmission equipment.

According to another feature of the development, the step for receiving said message transmitted by at least one receiving equipment comprising information on an error having occurred during the reception of broadcast data comprises a step for detecting said complex-valued mathematical sequence by cross-correlation.

The development further relates to a receiving equipment capable of transmitting a message comprising information on the reception of data and belonging to a broadcast group comprising a plurality of receiving equipments and a transmission equipment, said receiving equipment comprising means for: receiving a first message comprising an identifier of the broadcast group and at least a first set of information on the generation of said message, by said receiving equipment, comprising information on the reception of data, the first message being transmitted by a base station in a radio communication network to which all the equipments belonging to the broadcast group are connected, receiving a second message, broadcast by the transmission equipment, comprising the identifier of the broadcast group, a second set of information on the generation, by said receiving equipment, of said message comprising information on the reception of data, and at least one parameter pertaining to data to be broadcast by the transmission equipment, transmitting said message comprising information on an error having occurred during the reception of data broadcast by the transmission equipment.

Another subject matter of the development relates to a transmission equipment belonging to a broadcast group comprising a plurality of receiving equipments, said transmission equipment comprising means for: receiving a first message comprising an identifier of the broadcast group and at least a first set of information on the generation of said message, by said receiving equipment, comprising information on the reception of data, the first message being transmitted by a base station in a radio communication network to which all the equipments belonging to the broadcast group are connected, broadcasting a second message, intended for the receiving equipments of the broadcast group, comprising the identifier of the broadcast group, a second set of information on the generation, by said receiving equipment, of said message comprising information on the reception of data, and at least one parameter pertaining to data to be broadcast by the transmission equipment, receiving at least one message transmitted by at least one receiving equipment comprising information on an error having occurred during the reception of data broadcast by the transmission equipment.

Lastly, the development relates to computer program products comprising program code instructions for implementing the methods as described above when executed by a processor.

The development also relates to a recording medium readable by a computer, on which are recorded computer programs comprising program code instructions for executing the steps of the methods according to the development as described above.

Such a recording medium can be any entity or device capable of storing the rogrames. For example, the medium can include a means of storage, such as a ROM, for example a CD-ROM or a microelectronic circuit ROM, or a means of magnetic recording, for example a USB key or a hard drive.

Furthermore, such a recording medium can be a transmissible medium such as an electrical or optical signal, which can be routed over an electrical or optical cable, by radio, or by other means, in such a way that the computer programs it contains can be executed remotely. The programs according to the development can, in particular, be downloaded over a network, such as the Internet.

Alternatively, the recording medium can be an integrated circuit into which the programs are incorporated, the circuit being designed to execute or to be used in the execution of the aforementioned methods according to the development.

BRIEF DESCRIPTION OF THE DRAWINGS

Other objectives, features, and advantages of the development will become clearer from a reading of the following description, given as a simple and non-limiting illustrative example in reference to the figures, in which.

DETAILED DESCRIPTION OF CERTAIN ILLUSTRATIVE EMBODIMENTS

The general principle of the development is based on the use of a group identifier transmitted to each user equipment that is a member of the broadcast group so as to be able to share a time-frequency resource of a radio signal among equipments belonging to the broadcast group in order to transmit information on the reception of data broadcast by a transmission equipment belonging to the broadcast group, to other equipments belonging to the broadcast group over a communication channel. In the remainder of the document, implementation examples of the solution of the development are described in connection with a V2X system, but the development can apply to other contexts. More generally speaking, the development can apply to any group broadcasting system, i.e., a "groupcast" system, in which it is advantageous to obtain feedback on the reception of the broadcast data.

Figure 1:
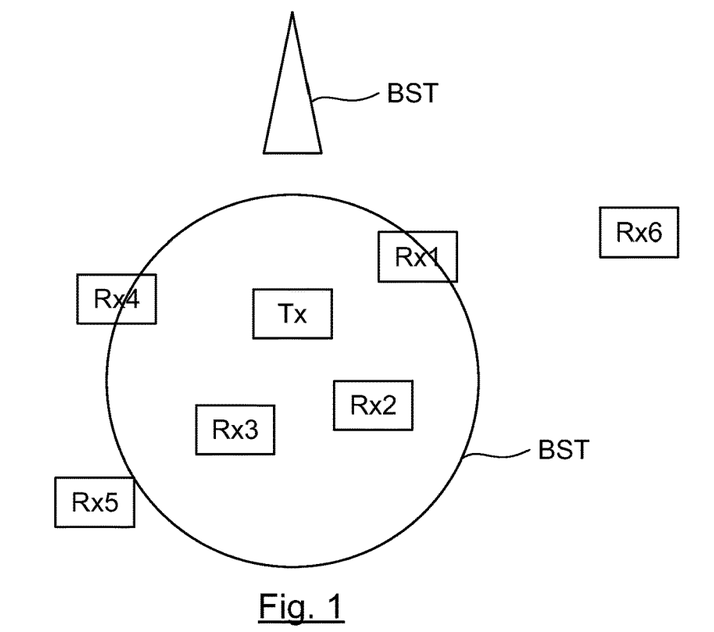
FIG. 1: this figure shows a V2X system in which the development is implemented.

We shall now present a V2X system, in reference to FIG. 1, in which the development is implemented.

Such a system comprises a base station BST, to which is connected a plurality of user equipments Tx and Rx1-Rx6. User equipments Tx and Rx1-Rx6 are, for example, mobile terminals carried on board vehicles.

User equipments Tx and Rx1-Rx6 are connected to base station BST and communicate directly and individually with the base station over a communication channel called "Uu" in the 3GPP RAN specifications.

The user equipments are broken down into two categories: a transmission equipment Tx capable of broadcasting data and receiving equipments Rx1-Rx6 capable of receiving the data broadcast by a transmission equipment Tx. In one embodiment of the development, user equipments Tx and Rx1-Rx6 are capable of broadcasting and receiving data according to the needs.

Figure 2:
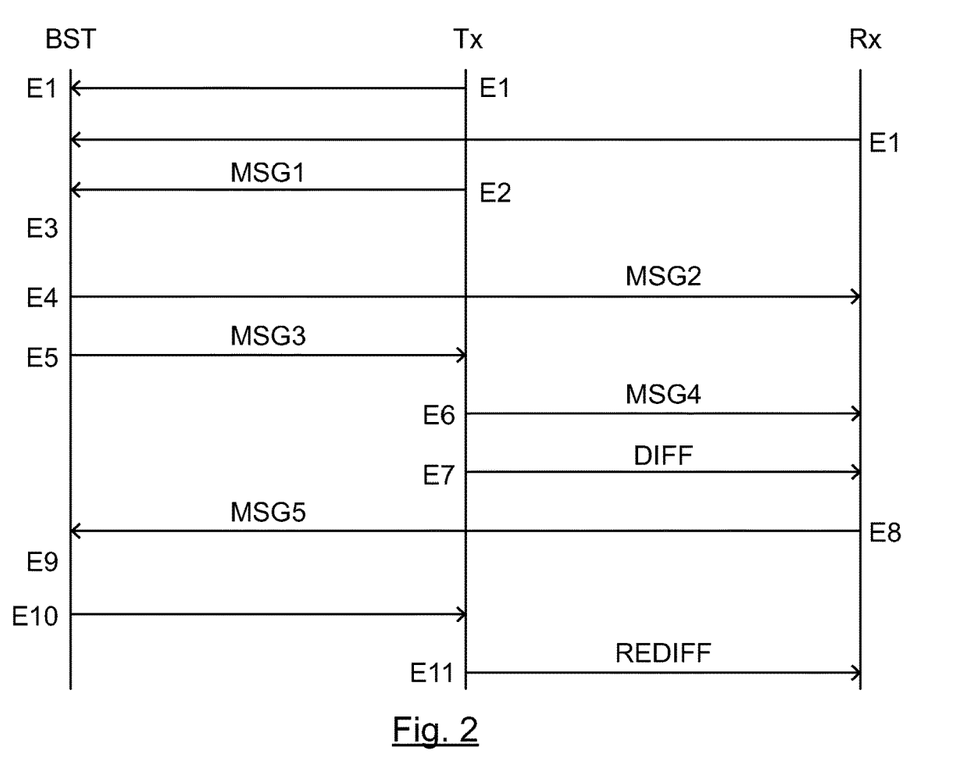
FIG. 2: this figure shows a diagram of the exchanging taking place between the base station, BST, and the user equipments in a general embodiment of the development.

FIG. 2 shows a diagram of the exchanges taking place between base station BST and user equipments Tx and Rx1-Rx6 in a general embodiment of the development.

In a first step E1, user equipments Tx and Rx1-Rx6 implement a procedure for connecting to base station BST. Base station BST then knows the identifier of each user terminal Tx and Rx1-Rx6 and exchanges data directly with each user equipment Tx and Rx1-Rx6 over communication channel Uu.

In step E2, transmission equipment Tx transmits a message MSG1 to base station BST requesting the role of transmitter within the broadcast group to which it is intended to be assigned.

During step E3, base station BST determines an identifier of broadcast group IdGD to which user equipments Tx and Rx1-Rx6 are intended to be assigned. Base station BST also determines the time-frequency resources to be used by receiving equipments Rx1-Rx6 in order to transmit information on the reception of the data broadcast by transmission equipment Tx as a function of the equipment intended to receive this information.

In a first embodiment of the development, the equipment intended to receive the information on the reception of the data broadcast by transmission equipment Tx is base station BST. Consequently, receiving equipments Rx1-Rx6 transmit the information on the reception of the data broadcast by transmission equipment Tx to base station BTS over communication channel Uu. Thus, base station BST identifies one or more pools of time-frequency resources of a radio signal carrying data over communication channel Uu, called resource pools Uu, in which the time-frequency resources used by receiving equipments Rx1-Rx6 are chosen. The various time-frequency resources included in resource pools Uu are identified by their position in each resource pool Uu, identified, for example, as first, second . . . nth in the first or nth resource pool Uu.

In a second embodiment of the development, the equipment intended to receive the information on the reception of the data broadcast by transmission equipment Tx is transmission equipment Tx. Consequently, receiving equipments Rx1-Rx6 transmit the information on the reception of the data broadcast by transmission equipment Tx to transmission equipment Tx over communication channel SL. In this second embodiment, base station BST identifies a pool of time-frequency resources of a radio signal carrying data over communication channel SL, called resource pool SL, in which the time-frequency resources used by receiving equipments Rx1-Rx6 are chosen. The various time-frequency resources included in resource pool SL are identified by their position, i.e., first, second . . . nth, in resource pool SL.

In step E4, base station BST transmits a message MSG2 to receiving equipments Rx1-Rx6. Message MSG2 comprises an identifier of broadcast group IdGD, an identifier of resource pool Uu selected for each receiving equipment Rx1-Rx6, for example first resource pool Uu or nth resource pool Uu, an identifier of resource pool SL, and information on the generation, by receiving equipments Rx1-Rx6, of a message comprising information on the reception of data broadcast by transmission equipment Tx.

In step E5, base station BST transmits a message MSG3 to transmission equipment Tx. Message MSG3 comprises information indicating that the role of transmitter is granted to transmission equipment Tx, the identifier of the broadcast group IdGD, an identifier of the resource pool Uu selected for transmission equipment Tx, for example first resource pool Uu or nth resource pool Uu, an identifier of resource pool SL, and information on the generation, by receiving equipments Rx1-Rx6, of a message comprising information on the reception of data broadcast by transmission equipment Tx.

The information on the generation of a message comprising information on the reception of data broadcast by transmission equipment Tx included in messages MSG2 and MSG3 comprises: a complex-valued mathematical sequence which, when applied to the radio signal to be used to transmit said message comprising information on the reception of data broadcast by the transmission equipment, modifies its amplitude so as to make it constant, a modulation by binary phase-shift keying (BPSK), the principle of which is to carry binary information using the phase of the radio signal, the total number of time-frequency resources of resource pool SL which are indicated by transmission equipment Tx during data broadcasting to receiving equipments Rx1-Rx6, and for each receiving equipment Rx1-Rx6, information indicating if it is authorized to transmit information on the reception of data broadcast to transmission equipment Tx, for example in the first implementation of the second embodiment of the invention, all receiving equipments Rx1-Rx6 are authorized to transmit information on the reception of broadcast data, an identifier of the implemented embodiment.

Depending on the embodiment of the development implemented by transmission equipment Tx and receiver equipments Rx1-Rx6, only some of the information included in messages MSG2 and MSG3 are used.

The data exchanged between base station BST and user equipments Tx and Rx1-Rx6 in steps E1 to E5 are transmitted over communication channel Uu.

In step E6, transmission equipment Tx broadcasts, using a time-frequency resource of resource pool SL dedicated to the transmission of control information, a message MSG4, referred to as a control message, comprising the identifier of the broadcast group IdGD, information on the generation, by receiving equipments Rx1-Rx6, of a message comprising information on the reception of the data broadcast by transmission equipment Tx, and information on the data to be broadcast.

The information on the data to be broadcast is, for example, information indicating whether the data are being broadcast for the first time or whether they constitute a new broadcast. The information on the data to be broadcast also comprises an identifier, in resource pool SL, of the time-frequency resources dedicated to data transmission, as well as information on the decoding of the data by receiving equipments Rx1-Rx6.

In the first embodiment of the development, the information on the generation, by receiving equipments Rx1-Rx6, of a message comprising information on the reception of the data broadcast by transmission equipment Tx included in control message MSG4 comprises: information indicating that the recipient equipment of the message comprising information on the reception of broadcast data is base station BST, identifiers, in resource pool Uu selected for each receiving equipment Rx1-Rx6, of the time-frequency resources to be used to transmit the message comprising information on the reception of broadcast data, for example first or third time-frequency resource of selected resource pool Uu. The identifier of selected resource pool Uu is not included in message MSG4.

During step E7, transmission equipment Tx broadcasts data accompanied by the identifier of the broadcast group IdGD using time-frequency resources of resource pool SL dedicated to data broadcasting.

In the first embodiment of the development, receiving equipments Rx1-Rx6 transmit, during step E8, a message MSG5 comprising information on an error having occurred during the reception of data broadcast to base station BST. Message MSG5 is transmitted using the time-frequency resources of resource pool Uu identified in messages MSG2 and MGS4.

In step E9, base station BST detects the presence of the information on an error having occurred during the reception of broadcast data.

In step E10, base station BST informs transmission equipment Tx that a retransmission of the data is required.

In step E11, the data are rebroadcast by transmission equipment Tx.

Figure 3:
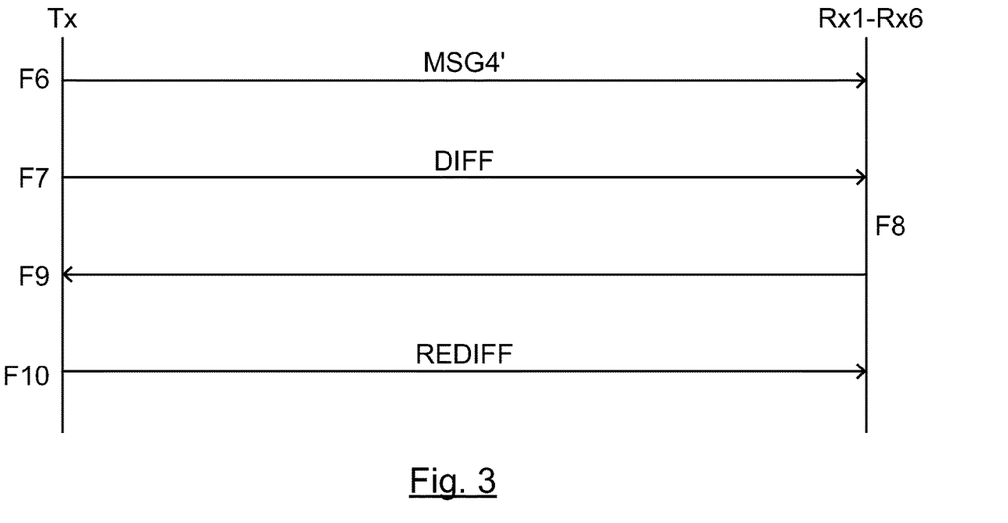
FIG. 3: this figure shows a diagram of the exchanges taking place between the transmission equipment and the receiving equipments in a first implementation of the second embodiment of the development.

FIG. 3 shows a diagram of the exchanges taking place between transmission equipment Tx and receiving equipments Rx1-Rx6 in a first implementation of the second embodiment of the development.

In this first implementation of the second embodiment of the development, steps E1 to E5 are identical to the steps described in reference to FIG. 2.

Thus, in step E6 transmission equipment Tx broadcasts, using a time-frequency resource of resource pool SL dedicated to the transmission of control information, a message MSG4', referred to as a control message, comprising the identifier of the broadcast group IdGD, information on the generation, by receiving equipments Rx1-Rx6, of a message comprising information on the reception of the data broadcast by transmission equipment Tx, and information on the data to be broadcast.

The information on the data to be broadcast is, for example, information indicating whether the data are being broadcast for the first time or whether they constitute a new broadcast. The information on the data to be broadcast also comprises an identifier, in resource pool SL, of the time-frequency resources dedicated to data transmission, as well as information on the decoding of the data by receiving equipments Rx1-Rx6.

In this first implementation of the second embodiment of the development, the information on the generation, by receiving equipments Rx1-Rx6, of a message comprising information on the reception of the broadcast data included in control message MSG4', comprises: an identifier of the time-frequency resource of resource pool SL to be used, for example the second time-frequency resource of resource pool SL, parameters relating to the complex-valued mathematical sequence transmitted in messages MSG2 and MSG3.

In this first implementation of the second embodiment of the development, the time-frequency resource of resource pool SL to be used to transmit data to transmission equipment Tx is common to all receiving equipments Rx1-Rx6. In other words, all receiving equipments Rx1-Rx6 use the same time-frequency resource for transmitting data to transmission equipment Tx.

Such a mathematical sequence is, for example, a Zadoff-Chu sequence in which one of the properties is that it is easily detectable.

In this first implementation of the second embodiment, only receiving equipments Rx1-Rx6 having to report an error in the reception of the data are authorized to use the time-frequency resource of resource pool SL and to generate the complex-valued mathematical sequence on the basis of the parameters included in message MSG4'.

In step E7, transmission equipment Tx broadcasts data accompanied by the identifier of the broadcast group IdGD using the time-frequency resources of resource pool SL dedicated to the broadcasting of data identified in message MSG4'.

Receiving equipments Rx2 and Rx5, for example, have not received the data broadcast by transmission equipment Tx.

Consequently, in step F8 receiving equipments Rx2 and Rx5 generate the complex-valued mathematical sequence on the basis of the parameters included in message MSG4' and transmit it to transmission equipment Tx using the second time-frequency resource of resource pool SL.

Using a single mathematical sequence that is common to all the members of the broadcast group makes it possible to do away with synchronization problems in the transmission of messages comprising information on the reception of data transmitted by various receiving equipments.

In step F9, transmission equipment Tx detects the presence of the mathematical sequence by cross-correlation, by listening to the second time-frequency resource of resource pool SL. Transmission equipment Tx also detects an energy level of the radio signal used for transmission of the mathematical sequence when this energy level is greater than a detection threshold. This double detection avoids false positives.

In this way, detection of the mathematical sequence in combination with detection of an energy level of the radio signal used for transmission of the mathematical sequence greater than a detection threshold indicates poor reception of the data broadcast by at least one of the receiving equipments Rx1-Rx6.

The identity of the receiving equipments having encountered a problem in receiving the broadcast data is of little importance, since in step F10 the data are broadcast again by transmission equipment Tx.

If transmission equipment Tx detects neither the mathematical sequence nor a variation in the energy level of the radio signal used for transmission of the mathematical sequence over a certain time after the broadcasting of the data, it means that all receiving equipments Rx1-Rx6 of the broadcast group have correctly received the broadcast data.

The mathematical sequence defined in step F8 can be used in the implementation of the first embodiment of the development. Indeed, message MSG5 can contain such a mathematical sequence. Base station BST then detects the presence of the mathematical sequence and a variation in the energy level of the radio signal used for transmission of the mathematical sequence. In this particular case, message MSG4 also comprises the parameters pertaining to the complex-valued mathematical sequence transmitted in messages MSG2 and MSG3.

Figure 4:
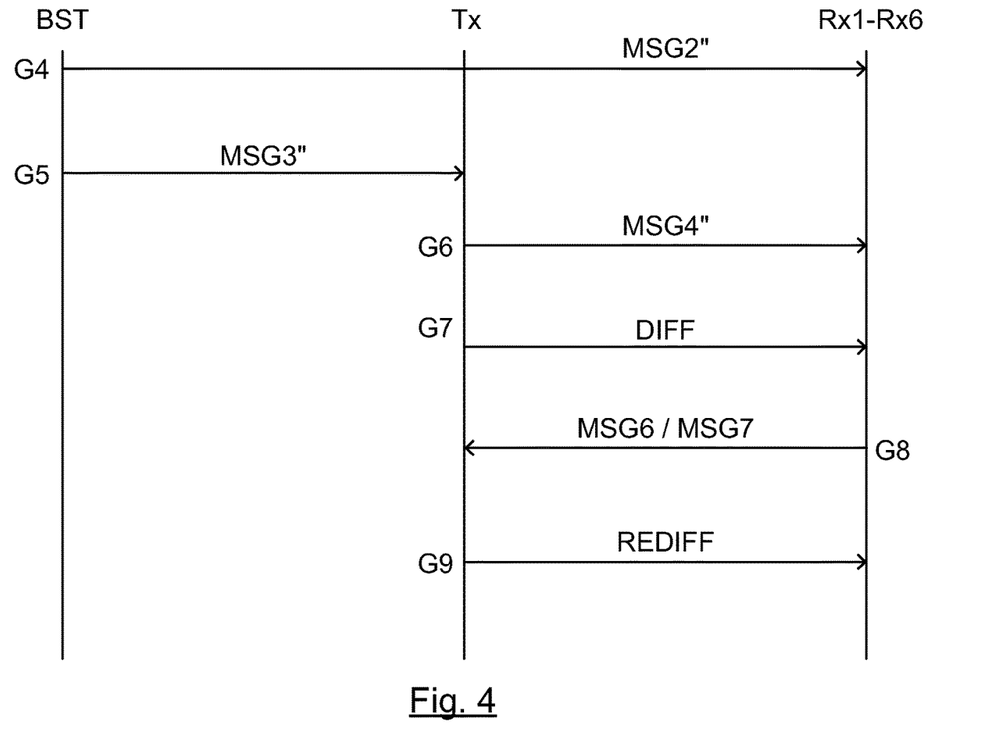
FIG. 4: this figure shows a diagram of the exchanges taking place between the transmission equipment and the receiving equipments in a second implementation of the second embodiment of the development.

FIG. 4 shows a diagram of the exchanges taking place between transmission equipment Tx and receiving equipments Rx1-Rx6 in a second implementation of the second embodiment of the development.

In this second implementation of the second embodiment of the development, steps E1 to E3 are identical to the steps described in reference to FIG. 2.

In step G4, base station BST transmits a message MSG2" to receiving equipments Rx1-Rx6. Message MSG2" includes the identifier of the broadcast group IdGD, the identifier of resource pool Uu, the identifier of resource pool SL, the information on the generation, by receiving equipments Rx1-Rx6, of a message comprising information on the reception of data broadcast by transmission equipment Tx, as well as the identifiers of receiving equipments Rx5 and Rx6 authorized to transmit information on the reception of the broadcast data.

Base station BST determines the identity of receiving equipments Rx1-Rx6 authorized to transmit information on the reception of the broadcast data as a function, for example, of their distance from transmission equipment Tx. Since base station BST communicates directly with all the user equipments belonging to the same broadcast group, it is capable of determining the relative position of each member of the broadcast group in relation to each other. Thus, in reference to FIG. 1, receiving equipments RX5 and Rx6 are the furthest away from transmission equipment Tx because, for example, they are located beyond a certain distance represented by circle C. Consequently, receiving equipments RX5 and Rx6 are the only ones to be authorized to transmit information on the reception of the broadcast data.

In step G5, base station BST transmits a message MSG3" to transmission equipment Tx. Message MSG3" comprises information indicating that the role of transmitter is granted to transmission equipment Tx, the identifier of the broadcast group IdGD, the identifier of resource pool Uu, the identifier of resource pool SL, and information on the generation, by receiving equipments Rx1-Rx6, of a message comprising information on the reception of data broadcast by transmission equipment Tx.

The information on the generation of a message comprising information on the reception of data broadcast by transmission equipment Tx included in messages MSG2 and MSG3 comprises: a complex-valued mathematical sequence which, when applied to the radio signal to be used to transmit said message comprising information on the reception of data broadcast by the transmission equipment, modifies its amplitude so as to make it constant, a modulation by binary phase-shift keying (BPSK), the principle of which is to carry binary information using the phase of the radio signal, the total number of time-frequency resources of resource pool SL which are indicated by transmission equipment Tx during data broadcasting to receiving equipments Rx1-Rx6, and for each receiving equipment Rx1-Rx6, information indicating if it is authorized to transmit information on the reception of data broadcast to transmission equipment Tx, in this case, for example, receiving equipments RX5 and Rx6 are informed of the fact that they are authorized to transmit information on the reception of the data, an identifier of the implemented embodiment, in this case the second implementation of the second embodiment of the development.

Depending on the embodiment of the development implemented by transmission equipment Tx and receivers Rx1-Rx6, only some of the information included in messages MSG2 and MSG3 is used.

In the second implementation of the second embodiment of the development, message MSG3" also comprises an indication of the number of receiving equipments Rx1-Rx6 authorized to transmit information on the reception of the broadcast data.

The data exchanged between base station BST and user equipments Tx and Rx1-Rx6 in steps G4 to G5 are transmitted over communication channel Uu.

In step G6, transmission equipment Tx broadcasts, using a time-frequency resource of resource pool SL dedicated to the transmission of control information, a message MSG4", referred to as a control message, comprising the identifier of the broadcast group IdGD, information on the generation, by receiving equipments Rx1-Rx6, of a message comprising information on the reception of the data broadcast by transmission equipment Tx, and information on the data to be broadcast.

The information on the data to be broadcast is, for example, information indicating whether the data are being broadcast for the first time or whether they constitute a new broadcast. The information on the data to be broadcast also comprises an identifier, in resource pool SL, of the time-frequency resources dedicated to data transmission, as well as information on the decoding of the data by receiving equipments Rx1-Rx6.

In this second implementation of the second embodiment of the development, the information on the generation, by receiving equipments Rx1-Rx6, of a message comprising information on the reception of the broadcast data included in control message MSG4", comprises: an identifier of the time-frequency resource of resource pool SL to be used by each receiving equipment RX5 and Rx6, for example the third time-frequency resource of resource pool SL for receiving equipment Rx5 and the fifth time-frequency resource of resource pool SL for receiving equipment Rx6, parameters on a modulation by binary phase-shift keying (BPSK), the principle of which is to carry binary information using the phase of the radio signal transmitted in messages MSG2" and MSG3".

Receiving equipments RX5 and Rx6 know which time-frequency resource of the resource pool is intended for them because they were informed by base station BST via message MSG2".

In step G7, transmission equipment Tx broadcasts data accompanied by the identifier of the broadcast group IdGD using the time-frequency resources of resource pool SL dedicated to the broadcasting of data identified in message MSG4".

Thus, in step G8, receiving equipments RX5 and Rx6 both transmit to transmission equipment Tx a message MSG6 and a message MSG7, respectively, comprising information on the reception of the broadcast data, each using the time-frequency resource of resource pool SL that was allocated to them, that is, the third resource of resource pool SL for receiving equipment Rx5 and the fifth resource of resource pool SL for receiving equipment Rx6. Messages MSG6 and MSG7 consist, for example, of a modulation by binary phase-shift keying, a +1 modulation of the phase of the radio signal indicating proper reception of the broadcast data, and a −1 modulation of the phase of the radio signal indicating erroneous reception of the broadcast data.

In step G9, when transmission equipment Tx detects the presence of a −1 modulation of the phase of the radio signal in at least one of the time-frequency resources of the radio signal associated with receiving equipment Rx5 or with receiving equipment Rx6, respectively, transmission equipment Tx rebroadcasts the data.

The modulation by binary phase-shift keying in step G8 can be used in the implementation of the first embodiment of the development. Indeed, message MSG5 can consist of such a modulation by binary phase-shift keying. Base station BST detects the modulation by binary phase-shift keying and knows the source thereof, since the base station communicates directly with each of the receiving equipments belonging to the broadcast group.

Figure 5:
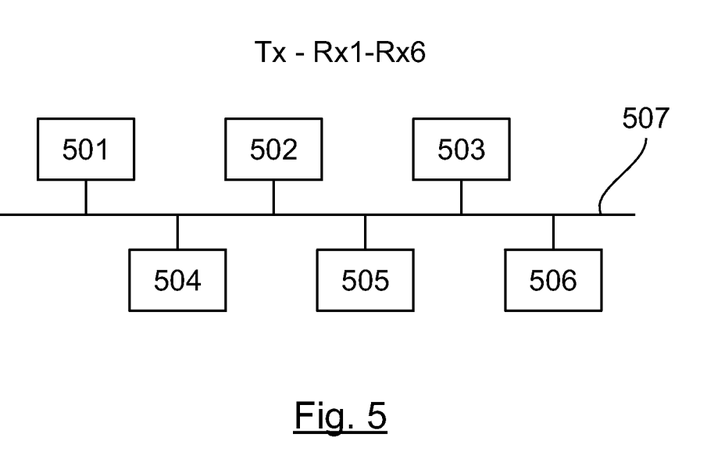
FIG. 5: this figure shows a user equipment Tx or Rx1-Rx6 according to one embodiment of the development.

FIG. 5 shows a user equipment Tx or Rx1-Rx6 according to one embodiment of the development. Such a user equipment Tx or Rx1-Rx6 is capable of implementing the various embodiments of the method described in reference to FIGS. 2-4.

A user equipment Tx or Rx1-Rx6 may comprise at least one hardware processor 501, a storage unit 502, an input device 503, a display device 504, an interface 505, and at least one network interface 506, which are connected to each other through a bus 507. Naturally, the component parts of user equipments Tx or Rx1-Rx6 can be connected by means of a connection other than a bus.

Processor 501 controls the operations of user equipment s Tx or Rx1-Rx6. Storage unit 502 stores at least one program for the implementation of the method according to one embodiment of the development, to be executed by processor 501, and various data, such as parameters used for the calculations performed by processor 501, intermediate data of the calculations performed by processor 501, and so on. Processor 501 can be made of any known and appropriate hardware or software, or through a combination of hardware and software. For example, processor 501 can be made of a piece of dedicated hardware such as a processing circuit, or a programmable processing unit such as a central processing unit that executes a program stored in a memory thereof.

Storage unit 502 can be made of any appropriate means capable of storing the program or programs and data in a way that is readable by a computer. Examples of storage unit 502 include non-transient computer-readable storage media, such as semiconductor memory devices and magnetic, optical, or magneto-optical recording media loaded into a read and write unit.

Input device 503 may consist of a keyboard, a pointing device such as a mouse to be used by a user to enter commands. Display device 504 may also consist of a display module, such as for example a graphical user interface (GUI).

Interface 505 provides an interface between a user equipment Tx or Rx1-Rx6 and another user equipment Tx or Rx1-Rx6 belonging to the same broadcast group.

At least one network interface 506 provides a connection between user equipments Tx or Rx1-Rx6 and base station BST via a radio connection.

The invention claimed is:

1. A method for transmitting a message comprising information on reception of data by a receiving equipment belonging to a broadcast group comprising a plurality of receiving equipments and a transmission equipment, the transmission method being implemented by the receiving equipment and comprising:
   receiving a first message comprising at least a first set of information on generation of the message, by the receiving equipment, comprising information on the reception of data, the first message being transmitted by a base station in a radio communication network to which all the equipments belonging to the broadcast group are connected 1 wherein the information on the generation of the message comprising information on the reception of data further comprises a complex-valued mathematical sequence which, when the sequence is applied to the radio signal to be used to transmit the message comprising information on the reception of data broadcast by the transmission equipment, modifies the amplitude of the radio signal to make it constant;
   receiving a second message, broadcast by the transmission equipment, comprising a second set of information on the generation, by the receiving equipment, of the message comprising information on the reception of data, and at least one parameter pertaining to data to be broadcast by the transmission equipment; and
   transmission of the message comprising information on an error having occurred during the reception of data broadcast by the transmission equipment.

2. The transmission method according to claim 1, wherein the information on the generation of the message comprising information on the reception of data comprises at least one identifier of time-frequency resources of at least one pool of time-frequency resources to be used to transmit the message comprising information on the reception of data.

3. The transmission method according to claim 2, wherein the first message further comprises a parameter indicating that the message comprising information on an error having occurred during the reception of data broadcast by the transmission equipment is transmitted to the base station.

4. The transmission method according to claim 2, wherein the first message further comprises a parameter indicating that the message comprising information on an error having occurred during the reception of data broadcast by the transmission equipment is transmitted to the transmission equipment.

5. The transmission method according to claim 4, wherein the information on the generation of the message comprising information on the reception of data further comprises a complex-valued mathematical sequence which, when the sequence is applied to the radio signal to be used to transmit the message comprising information on an error having occurred during the reception of data broadcast by the transmission equipment, modifies the amplitude of the radio signal to make it constant.

6. The transmission method according to claim 4, wherein each receiving equipment having received an identifier of a time-frequency resource of the at least one pool of time-frequency resources to be used to transmit the message that is specific to it, the method comprises, as applicable, transmitting a message comprising information indicating a proper reception of the data broadcast by the transmission equipment.

7. A method of communication between transmission equipment and at least one receiving equipment, both of which belonging to a broadcast group, the communication method being implemented by the transmission equipment and comprising:
   receiving a first message comprising at least a first set of information on generation of the message, by the receiving equipment, comprising information on reception of data, the first message being transmitted by a base station in a radio communication network to which all the equipments belonging to the broadcast group are connected, wherein the information on the generation of the message comprising information on the reception of data further comprises a complex-valued mathematical sequence which, when the sequence is applied to the radio signal to be used to transmit the message comprising information on the reception of data broadcast by the transmission equipment, modifies the amplitude of the radio signal to make it constant;
   broadcasting a second message, intended for the receiving equipment of the broadcast group, comprising a second set of information on the generation, by the receiving equipment, of the message comprising information on the reception of data, and at least one parameter pertaining to data to be broadcast by the transmission equipment; and
   receiving at least one message transmitted by at least one receiving equipment comprising information on an error having occurred during the reception of data broadcast by the transmission equipment.

8. The communication method according to claim 7, wherein the information on the generation of the message comprising information on the reception of data comprises at least one identifier of time-frequency resources of at least one pool of time-frequency resources to be used to transmit the message comprising information on the reception of data.

9. The communication method according to claim 8, wherein the information on the generation of the message comprising information on the reception of data further comprises a complex-valued mathematical sequence which, when the sequence is applied to the radio signal to be used to transmit the message comprising information on an error having occurred during the reception of data broadcast by the transmission equipment, modifies the amplitude of the radio signal to make it constant.

10. The communication method according to claim 9, wherein receiving the message transmitted by at least one receiving equipment comprising information on an error having occurred during the reception of broadcast data comprises detecting the complex-valued mathematical sequence by cross-correlation.

11. Receiving equipment capable of transmitting a message comprising information on reception of data and belonging to a broadcast group comprising a plurality of receiving equipments and a transmission equipment, the receiving equipment comprising at least a hardware processor configured to:

receive a first message comprising at least a first set of information on generation of the message, by the receiving equipment, comprising information on the reception of data, the first message being transmitted by a base station in a radio communication network to which all the equipments belonging to the broadcast group are connected, wherein the information on the generation of the message comprising information on the reception of data further comprises a complex-valued mathematical sequence which, when the sequence is applied to the radio signal to be used to transmit the message comprising information on the reception of data broadcast by the transmission equipment, modifies the amplitude of the radio signal to make it constant;

receive a second message, broadcast by the transmission equipment, comprising a second set of information on the generation, by the receiving equipment, of the message comprising information on the reception of data, and at least one parameter pertaining to data to be broadcast by the transmission equipment; and transmit the message comprising information on an error having occurred during the reception of data broadcast by the transmission equipment.

12. Transmission equipment belonging to a broadcast group comprising a plurality of receiving equipments, the transmission equipment comprising at least a hardware processor configured to:

receive a first message comprising at least a first set of information on generation of the message, by the receiving equipment, comprising information on reception of data, the first message being transmitted by a base station in a radio communication network to which all the equipments belonging to the broadcast group are connected, wherein the information on the generation of the message comprising information on the reception of data further comprises a complex-valued mathematical sequence which, when the sequence is applied to the radio signal to be used to transmit the message comprising information on the reception of data broadcast by the transmission equipment, modifies the amplitude of the radio signal to make it constant;

broadcast a second message, intended for the receiving equipment of the broadcast group, comprising a second set of information on the generation, by the receiving equipment, of the message comprising information on the reception of data, and at least one parameter pertaining to data to be broadcast by the transmission equipment; and receive at least one message transmitted by at least one receiving equipment comprising information on an error having occurred during the reception of data broadcast by the transmission equipment.

13. A non-transitory computer storage medium, storing instructions of a computer program causing implementing the transmission method according to claim 1, when the program is executed by a processor.

14. A non-transitory computer storage medium, storing instructions of a computer program causing implementing the communication method according to claim 7, when the program is executed by a processor.

* * * * *

UNITED STATES PATENT AND TRADEMARK OFFICE
CERTIFICATE OF CORRECTION

| | | |
|---|---|---|
| PATENT NO. | : 12,004,199 B2 | |
| APPLICATION NO. | : 17/416422 | |
| DATED | : June 4, 2024 | |
| INVENTOR(S) | : Hao Lin | |

It is certified that error appears in the above-identified patent and that said Letters Patent is hereby corrected as shown below:

In the Specification

Column 5, Line 31 (approx.), delete "rogrames." and insert -- programs. --.

In the Claims

Column 13, Line 24, Claim 1, delete "connected 1" and insert -- connected, --.

Signed and Sealed this
Twenty-seventh Day of August, 2024

*Katherine Kelly Vidal*

Katherine Kelly Vidal
*Director of the United States Patent and Trademark Office*